423-445
2/11/86 OP 4,569,835

United States Patent [19]
[11] Patent Number: 4,569,835
Di Ció et al.
[45] Date of Patent: Feb. 11, 1986

[54] METHOD OF PRODUCING CARBONACEOUS BLOCKS IN A TUNNEL TYPE FURNACE

[75] Inventors: Alessandro Di Ció, Bergamo; Goffredo Buttazzoni, Mestre, both of Italy

[73] Assignee: Alusuisse Italia S.p.A., Milan, Italy

[21] Appl. No.: 520,673

[22] Filed: Aug. 5, 1983

[30] Foreign Application Priority Data

Aug. 18, 1982 [IT] Italy .............................. 22890 A/82

[51] Int. Cl.[4] .............................................. C01B 31/00

[52] U.S. Cl. ................................... 423/445; 264/29.1; 264/29.6; 264/29.7

[58] Field of Search ............... 423/445, 449; 264/29.1, 264/29.3, 29.6, 29.7; 201/32

[56] References Cited

U.S. PATENT DOCUMENTS

| | | | |
|---|---|---|---|
| 1,170,313 | 2/1916 | Nagelschmitz | 423/449 |
| 2,594,226 | 4/1952 | Shea, Jr. | 264/29.7 |
| 2,983,022 | 5/1961 | Dressler et al. | 264/29.7 |
| 3,009,863 | 11/1961 | Angevine | 264/29.7 |
| 3,822,190 | 7/1974 | Fischer | 264/29.6 |

*Primary Examiner*—William R. Dixon, Jr.
*Assistant Examiner*—Steven Capella
*Attorney, Agent, or Firm*—Guido Modiano; Albert Josif

[57] ABSTRACT

This invention relates to a method of producing carbonaceous blocks, and more particularly to a method of manufacturing anodes for the electrolytic reduction of aluminum, consisting of coating said blocks with an antioxidizer protective powder and calcining them while being passed through a tunnel type furnace in an oxidizing atmosphere in conformity with thermal conditions whereby, as said blocks reach a temperature of 200°-600° C. at which they release volatile organic substances, said oxidizing atmosphere has a temperature of at least 550° C.; thus, complete combustion of the volatile substances is accomplished in said furnace to yield gases which are free of said volatile organic substances, and wherein said blocks later attain a final baking temperature of up to about 1,200° C.

10 Claims, 3 Drawing Figures

METHOD OF PRODUCING CARBONACEOUS BLOCKS IN A TUNNEL TYPE FURNACE

BACKGROUND OF THE INVENTION

This invention relates to a method of producing carbonaceous blocks in a tunnel type furnace, and in particular, to a method of producing electrodes for the process of electrolytic reduction of aluminum in the molten state according to the Hall-Herault method.

The carbonaceous blocks are generally produced by pressure molding or extruding a carbon-carrying material mixture, such as petroleum coke, anthracite, gas black, graphite, and the like, with a binder material, such as tars and/or pitches. By calcining such blocks, the binder is baked to achieve desired mechanical and electric characteristics.

In general, anodes for electrolytically reducing aluminum are produced in so-called loop furnaces. For calcining such blocks, tunnel furnaces have also been proposed, wherein the blocks are coated with powder carbon to protect them against oxidation and stored into muffles mounted onto carriages which are pushed through the furnace in accordance with a preset thermal schedule. The temperature schedule, that is the heating rate, is a determining parameter in the method for producing high quality calcined electrodes.

During heat application, and in the temperature range from 200° C. to 600° C., and to a larger extent in the 400° C. to 500° C. range, the blocks being calcined release volatile organic substances originating from the decomposition and/or distillation of binder fractions in either gas or vapor form. Such volatile substances, which comprise essentially aromatic hydrocarbons, represent a big disadvantage especially from the standpoint of pollution and safety of the working areas, and accordingly, their effective disposal constitutes a serious problem to be solved by the methods of preparing carbonaceous blocks.

Disposal of volatile substances has not been effectively controlled heretofore, with the result that, particularly for the production of anodes for aluminum electrolysis, loop-type furnaces are almost exclusively used in practice, in spite of numerous methods of removing volatile decomposition products having been proposed.

Known from German Pat. No. 1508515 is a method of baking carbonaceous blocks in a tunnel type furnace, whereby tapping gases are supplied to the furnace inlet up to the level of the tunnel where binder vapor emission takes place, which gases are caused to flow in the same direction as the material being baked, extracted at that location along with the vapors released from the binder decomposition, and burned onto a catalyst, thereafter the burned, oxygen-free hot gases are redirected into the furnace.

While that method enables the use of a fumes scrubber to be avoided, which is highly important from the economical and environment control standpoints, it nevertheless has the disadvantage of providing for the extraction of the vapors and gases from the tunnel furnace system, which involves technical difficulties and is uneconomical.

SUMMARY OF THE INVENTION

It is an object of this invention to provide a method which enables the baking of carbonaceous blocks in a tunnel type furnace without requiring the availability of fumes scrubbing equipment, and can obviate the above-cited prior disadvantages.

A further object of the invention is to provide such a method which can be implemented through shortened cycles, and accordingly, be economically advantageous, while yielding high quality calcined products, and electrodes in particular.

These and other objects, such as will be more readily apparent hereinafter, are achieved by a method according to the invention for calcining carbonaceous bodies, and in particular for manufacturing anodes intended for the electrolytic reduction of aluminum, characterized in that said bodies are coated with an antioxidizer protective powder and calcined while being passed through a tunnel type furnace in an oxidizing atmosphere and in conformity with thermal conditions whereby, as said bodies reach a temperature of 200° C. to 600° C. at which said bodies release volatile organic substances, said oxidizing atmosphere has a temperature of at least 550° C., thereby complete combustion of the volatile substances in said furnace is accomplished to yield gases which are free from said volatile organic substances, and wherein said bodies later reach a final baking temperature of up to about 1,200° C.

The method of this invention achieves complete combustion of the volatile organic substances generated by the binder decomposition in situ, i.e. within the furnace.

During the process carried out in the furnace, the carbonaceous bodies being baked are arranged, as is customary, in supporting muffles which usually comprise side, vertical, and bottom walls, being open at the top. Although muffles formed from an impervious material may also be used, according to an advantageous aspect of this invention, muffles are utilized the walls and bottom whereof are made of a porous refractory material which is pervious to the volatile matter released by the binder. Thus, combustion will take place on the exterior of the muffle walls as well as on the surface of the free layer of protective or filler powder. Consequently, a faster and more complete combustion can be achieved.

In implementing the inventive method, a critical factor is that the temperature of the oxidizing atmosphere at the furnace area where volatile substances are released be above 550° C., because only then will a complete in situ combustion of such volatile substances become feasible. Said temperature will preferably exceed 600° C., e.g. range from 600° C. to 900° C. By contrast, if the atmosphere at the area in question is lower than 550° C., then the volatile substances would be directed to either colder or hotter places in the furnace, depending on the furnace conduction and direction of the gas flow. In the former case, they either condensate and form tar deposits or stay with the exhausted gases and require a scrubbing system for the fumes which are exhausted from the furnace, whereas in the latter case, the volatile substances burn at uncontrolled places in the furnace, which involves a potentially dangerous situation.

Further, also critical to the implementation of this method is the concentration of oxygen in the atmosphere of the area where the volatile substances from the binder decomposition are released and subjected to combustion. That concentration should be of at least 2% by volume of the total volume of dry gases present in this area. In practice, the oxygen concentration should exceed 2% by volume.

A lower concentration than the minimum value specified above would not enable complete combustion of the volatile substances at the area where they are released, and the same problems as mentioned above would be encountered in relation to the range of temperatures required for said area.

In general, and within the limits specified, a decrease in oxygen concentration brings about an increase in the temperature of the atmosphere for complete combustion of the volatile substances. By converse, an increase in oxygen concentration enables said temperature to be lowered.

In the manufacture of electrodes, and particularly of anodes for aluminum electrolysis, it is known from the technology of loop furnaces that the 200° C. to 600° C. baking range is exceedingly critical to the anode quality in that the coking reaction of the tar or pitch which makes up the binder, and concurrent release of the volatile substances, induce stresses in the electrode, which stresses, in the instance of an uncontrolled operation of the loop furnaces, result in crack formations whereby the electrode cannot be used for the specific objects for which it has been manufactured. It has been found that with loop furnaces, heating gradients of 10°-15° C. per hour must be adopted in the 200° C. to 600° C. range, to prevent stressing of the electrodes and consequent cracking thereof.

Unexpectedly, it has been found, instead, that in that same temperature range (200°-600° C.), in the implementation of the method according to this invention, much higher—up to about 40°-45° C./hour—temperature gradients are acceptable without the finished electrodes showing crack formations. This apparently enables substantial shortening of the baking cycles, and above all, of the residence time at the critical heating range of 200° C. to 600° C., whereat the binder undergoes the changes specified hereinabove.

BRIEF DESCRIPTION OF THE DRAWINGS

Further advantages and features of the invention will be more clearly understood from the following description of specific embodiments thereof, with reference to the accompanying drawings, where.

DESCRIPTION OF THE PREFERRED EMBODIMENTS

Figure 1:
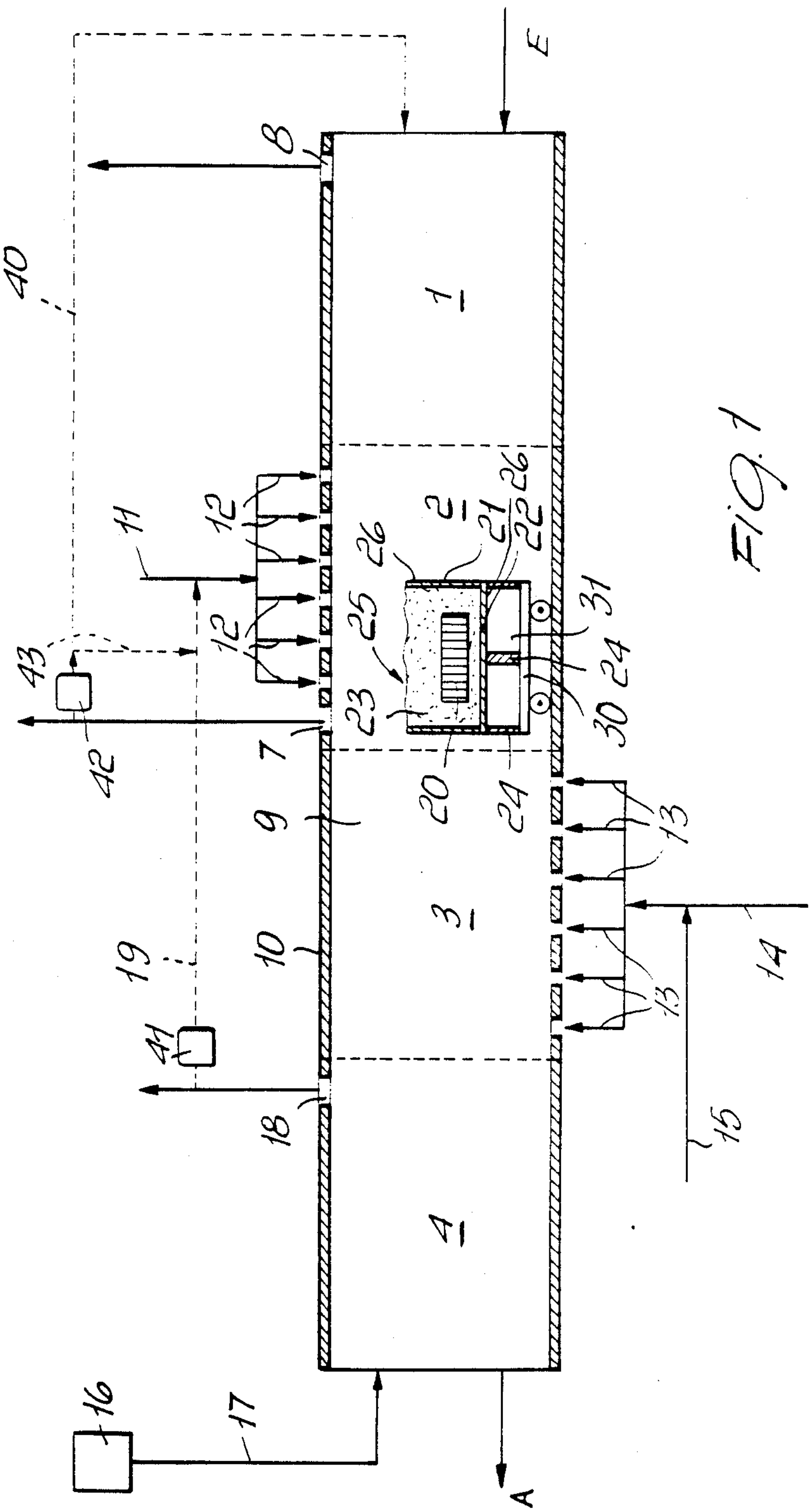
FIG. 1 shows diagramatically a longitudinal section view of a tunnel type furnace wherein the method of this invention is carried out.

As shown in FIG. 1, the furnace, whose inlet and outlet port closure doors have been omitted from the drawing and wherein the direction of motion of the carbonaceous products to be baked is indicated by the arrow E, is divided into four zones, namely a heating zone 1, combustion zone 2, baking zone 3, and cooling zone 4.

At the zone 1, the anodes are introduced into the furnace and brought to a temperature of about 200° C., as measured at the anode surfaces. Heat is applied by utilizing the hot furnace gases which, according to one possible embodiment of this method, are caused to flow in countercurrent with respect to the direction of motion of the product being baked (direction A-E) and ejected at 8.

For the continuous or intermittent transport of the anodes 20 through the tunnel, the anodes are arranged in a muffle of a refractory material which comprises a structure having sidewalls 21 and a bottom wall 22, it being supported on a metal carriage 30. The anodes are coated, all over their faces, including the bottom one, with a carbonaceous powder performing a protective function against oxidation.

Where a muffle 21,22 accommodates plural anodes 20, the anodes 20 are so arranged as to allow the batch of anodes 20 to be fully coated with carbonaceous powder. The bottom of the muffle 22 is separated from the metal carriage 30 by vertical elements 24 so as to leave a space 31 approximately 30 cm high, wherethrough the combustion gases from the following baking zone 3 can flow. The distance from the top edges of the muffle 21 and crown 10 of the tunnel is about 40 cm. This arrangement enables an almost uniform circulation of the furnace gases around the entire surface of the muffle. The metal carriage 30 is protected by a refractory lining, not shown in the figure, as is conventional with high temperature processes.

At the zone 2, where the crude anodes 20 release the volatile substances, that is where the anode temperature is in the 200° C. to 600° C. range, the temperature of the furnace atmosphere is at least 550° C., preferably 600° C.

At this zone, the furnace atmosphere is to be sufficiently oxidizing, i.e. should contain all of the oxygen required for complete combustion of the volatile substances released from the binder. This condition is achieved when the furnace gases flowing out of the zone 2 contain at least 2% by volume of oxygen with reference to the overall volume of dry gases, that is neglecting the water content.

Directly upon the volatile substances issuing from the surfaces 25 of the protective powder 23, or in the instance of porous wall muffles also from the surfaces 26, they contact the oxidizing hot gases being fed into the furnace, and are burned completely on the spot, i.e. in situ.

As they pass through the baking cycle, the anodes have a surface temperature which is higher than that reached by their core mass.

At the zone 2, the temperature of the anodes 20 may vary from 200° C. (minimum temperature of the surface of the anodes 20 when the core temperature is lower) to 600° C. (the temperature reached inside the anodes 20, which corresponds to a higher surface temperature). The lowest temperature, at 200° C., of the anodes 20 is reached at the zone 2 on the boundary with the zone 1. At that location, the gases within the furnace will have a minimum temperature of 550° C. and an oxygen content of at least 2% by volume of the dry gas. The 600° C. temperature of the anodes 20, at the center thereof, will be reached at the zone 2 on the boundary with the zone 3. At this location, volatile substances cease to be emitted. The furnace gas temperature will usually be here in excess of 900° C. and the oxygen content, as referred to the dry gas, is the least possible and in all cases related to the type of combustion being carried out at the zone 3 by means of the burners 13.

The gas flow rate at the zone 3 toward the zone 2 is not normally adequate to supply the required amounts of $O_2$ for burning the volatile substances on the surfaces 25 and 26. Then, air is delivered to the zone 2 through the conduit 11 and inlet nozzles 12; this feed may either comprise cool air or preheated air to regulate the temperature at the zone 2, in conformity with the above specifications. As a rule, cool air would be delivered to prevent the amount of heat generated from heating the gases, on account of the combustion, to such a point as to exceed the gradients set for the heating of the anodes 20, which thing, as pointed out above, would result in reject.

It has been found that the admission of cool air into the furnace in a suitable amount to cause complete combustion of the volatile substances and maintain an $O_2$ concentration of 2% by volume, based on the dry gas volume, results at the boundary between the zones 1 and 2 in the establishment of a thermal balance which corresponds to the temperature of the gases at such zones of about 850° C. to 900° C. A larger admission of cool air, e.g. one corresponding to an oxygen content of 5% by volume of the dry gas, lowers the temperature down to about 730° C. Similarly, a temperature of about 600° C. can be reached where the content of $O_2$ is 8.3% by volume of dry gas.

The arrangement for air admission is of primary importance to the inventive method.

The nozzles 12 are adjustable and located on the crown 10 and sidewalls 9 of the tunnel furnace, at the zone 2. The pressure of the air utilized and diameter of the nozzles 12 are controlled such that thin fluid streams are introduced into the furnace at a velocity of about 50 m/sec in a perpendicular direction to the main direction A–E of the gases, thereby a whirling motion of the gases is induced at the zone 2 having a powerful component in the transverse direction and a much weaker one in the longitudinal direction. The whirling flow fully envelops the muffle 21,22 on the carriage 30 and results in a high rate of heat transfer and uniform temperature across transverse sections to the axis of the furnace at the zone 2.

At the zone 3, the anodes 20, now free of the volatile substances, are brought to a temperature of 1000°–1200° C., preferably in the 1050° C. to 1150° C. range, through conventional systems and burners 13 which are operable on gaseous and/or fluid and/or fluidizable fuels fed over the lines for the fuel 14 and combustion-supporting air 15, and adapted to supply the required thermal energy to this furnace zone.

At the zone 4, the anodes 20 are cooled with pressurized air by means of the fan 16 and via the ductings 17. Most of the cooling air is removed from the furnace through the outlet 18. The temperature of the exiting air at the outlet 18 will usually vary between 100° C. and 500° C., according to the intensity of the cooling process, i.e. the flow rate of the air through the blower arrangement 16,17.

By suitably controlling the outlet 18, there is left but a small part of the cooling air (10–15% at most) to flow from the zone 4 to the zones 3 and 2.

A part of the cooling air drawn through the outlet 18 may be injected, via the duct 19 and fan 41, into the zone 2 in lieu of the cool air, thus affording an added ability to influence the atmosphere of the zone 2, that is both the temperature and $O_2$ concentration thereof.

After cooling, the carriage 30 is withdrawn from the furnace at the outlet A, and the anodes are unloaded from the muffle 21,22.

As an alternative to the conventional method wherein the main gas stream flows primarily through the furnace interior in countercurrent relationship with the direction of advance of the carriage 30, it would also be possible to divide the gas into two streams. Through the zones 4 and 3 the gases flow, as outlined above, in countercurrent relationship with the movement of the carriage 30, and leave the furnace through the outlet 7 which is located at the zone 2, on the boundary thereof with the zone 3. The second stream passes into the zones 1 and 2 in the same direction as the carriage 30 and leaves again through the outlet 7. In the latter case, a stream of heated cooling air would be delivered over the system 41,19 and 40 to the inlet E.

A further modified embodiment may be implemented through the utilization of the ducts 43 and 40 and fan 42, to accomplish recirculation of the hot gases issuing from the chimney 7.

This method has in particular the advantage of requiring no fumes scrubber system, since the volatile substances are thoroughly burned and a reliable control of the process taking place in the furnace is ensured. Further, very high heating rates for the anodes 20 at the zone 2 are made possible, while obtaining excellent quality products, and the process may be surveyed by a much reduced number of operators. All this involves improved economical results in the production of carbonaceous blocks, in particular anodes intended for electrolytically reducing aluminum.

Figure 2:
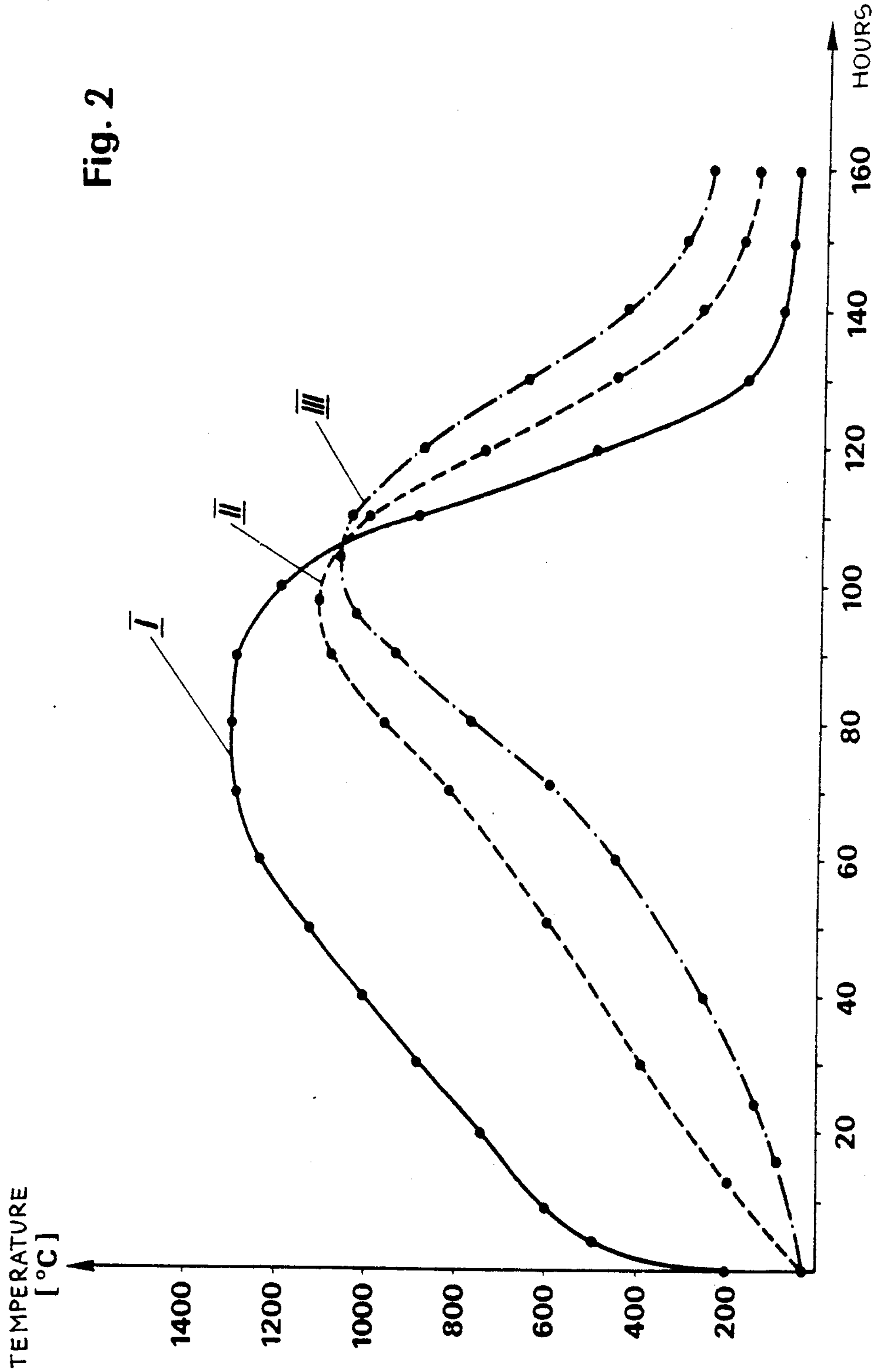
FIG. 2 is a calcination curve according to Example 1.
Figure 3:
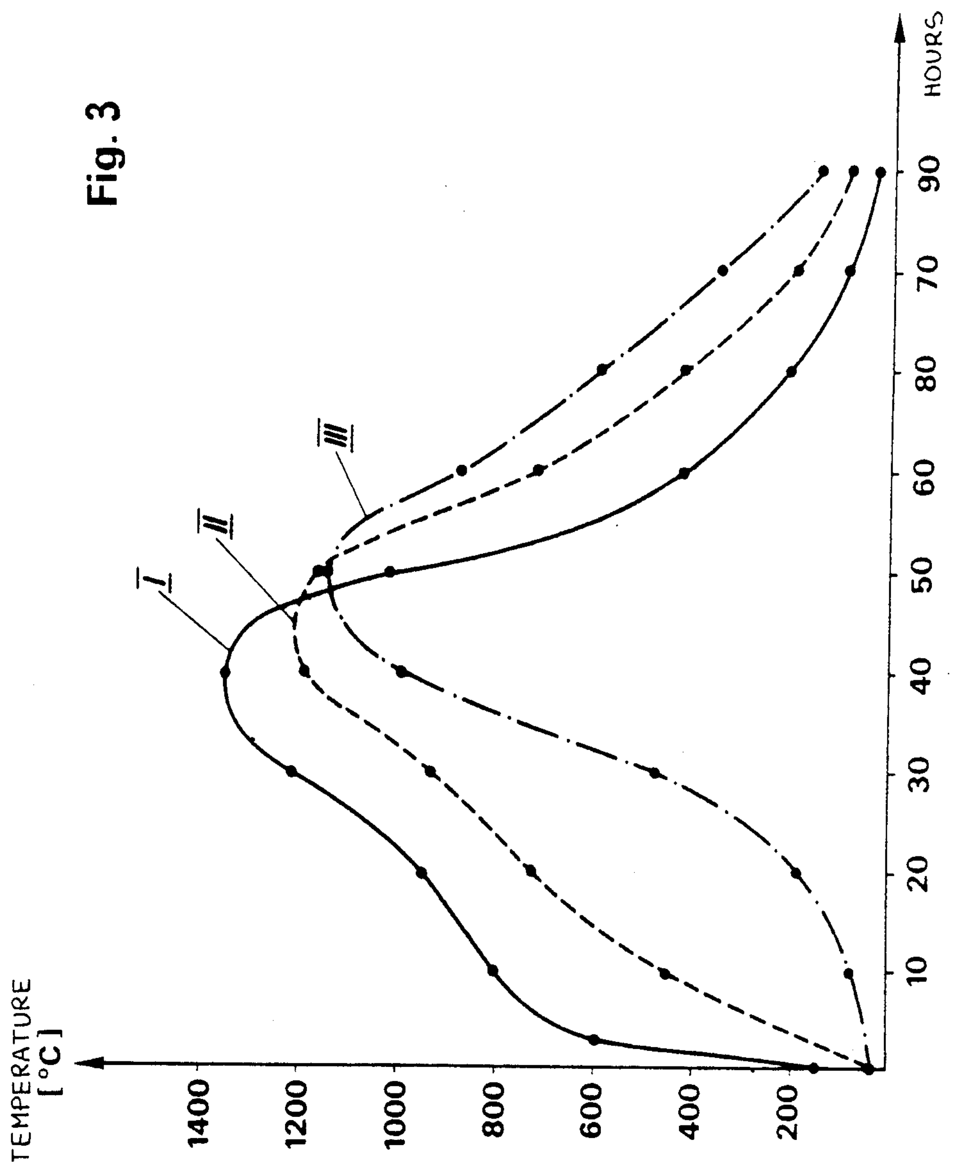
FIG. 3 is a calcination curve according to Example 2.

In FIGS. 2 and 3, which relate respectively to Examples 1 and 2 herein below, the curves I, II, and III illustrate the pattern of the temperatures measured in the furnace atmosphere (the furnace fumes) and on the external surface and interior of the anodes 20, respectively.

EXAMPLE 1

Carriages for transporting muffles filled with anodes, to the same design as described above and having a length of 238 cm, width of 140 cm, and height of 139 cm, are loaded as follows.

A layer of a carbonaceous powder (in this instance metallurgical coke) is laid over the bottom of the muffles to a thickness of 15 cm. Arranged on this layer are four anodes, each having a length of 110 cm, width of 52 cm, and height of 51 cm. Four additional anodes are placed on top of the former four, thereby a group of eight anodes is formed which is 208 cm long, 110 cm wide, and 104 cm high. The distance from the side (vertical) walls of the muffle to the outer vertical walls of the anode group is 15 cm. This empty space is filled with carbonaceous powder. The top surface of the anode group is covered with a 15 cm layer of that same carbonaceous powder, thereby the anode group is protected on each side by a 15 cm thick layer of that material. Finally, arranged over the top surface of the muffle are plates of a refractory material, having a thickness dimension of 5 cm, for the purpose of maintaining the combustion of the material made up of carbonaceous powder at the lowest possible level.

Carriages loaded in this manner are then introduced into a tunnel type furnace at regular intervals, and the rate of advance through the furnace interior is controlled such that the overall residence time in the furnace be about 160 hours for each carriage.

One carriage in the carriage train is provided with thermocouples positioned in contact with the surface of the anode group, so that the anode highest temperatures during the heating step can be recorded. Another thermocouple is positioned at the geometric center of the anode group, at the location where the lowest anode temperatures are recorded during the heating step. The thermocouples are connected, via adjusted cables protected by insulating materials, to a temperature recorder. Thus, the temperature pattern can be monitored throughout the baking cycle. At the same time, also measured and recorded are the flue gas temperatures by means of a second set of thermocouples positioned within the furnace. Once the operational conditions have struck a balance, the recorded temperatures will correspond to those of FIG. 2.

The following may be observed. The rate at which the temperatures increase both within and without the anode group is very low in the temperature range from 200° C. to 600° C., which represents the most critical of ranges; in this range, the temperature gradients are 10°–11° C./hour. The highest temperature level is reached over about 95 hours (at the external surface of the anode group), and about 105 hours (at the center of the anode group). At the external surface, the highest temperature is about 1100° C., while 1060° C. are reached at the anode center. The flue gas highest temperature is 1300° C. The temperature at the anode external surfaces raises to 200° C. in about 13 hours. Since the anode begins to release organic matter from this point, the fumes or flue gas temperature has been here correspondingly regulated to about 650° C. by injecting cool air as described hereinabove. The oxygen concentration at this very location (whereat the anodes attain a temperature of 200° C. on their external surfaces), and in these conditions, is 7% by volume (referred to "dry" gases). Such conditions have enabled the production of very good quality anodes, and their output, in the industrial application of electrolytic reduction of aluminum, has shown to be comparable to that to be obtained from the best of electrodes produced on conventional loop furnaces. In the course of the experiment, the fumes issuing from the process being carried out in the furnace have been monitored almost continuously, and they have shown no aromatic hydrocarbon contents, thus providing evidence of complete combustion of the volatile substances released within the furnace itself, thanks to the method according to this invention.

EXAMPLE 2

Carriages transporting anode muffles to the same design as above, and having a length of 224 cm, width of 126 cm, and height of 73 cm, have been loaded similarly to Example 1, but for the following exceptions:

(1) the anodes placed inside the muffles were just four, arranged in a single layer; and
(2) the thickness dimension of the protective carbonaceous powder layer at the muffle bottom, over the vertical walls of the muffle, and over the anode group, was decreased to 8 cm.

The anodes have been arranged as above in order to be able to examine the anode calcination at very high thermal gradients at the area where the anodes attain a temperature in the 200° C. to 600° C. range. This explains why the thickness or depth of the carbonaceous powder layer (which is characterized by low thermal conductivity) has been reduced to 8 cm. Further, by employing a single layer instead of two anode layers, the heat distribution inside the anodes is favored and the risk of inducing excessively high thermal stresses therein is attenuated.

The pattern of the temperature curves is illustrated in FIG. 3. The following may be observed. The rate of increase of the anode temperature in the 200° C. to 600° C. range is different inside the anodes from their external surfaces. The mean temperature gradient is about 34° C./hour inside the anodes, and about 40° C./hour on the external surfaces thereof. The peak temperature is reached in only 45 hours (external surface) or 50 hours (inside). 1200° C. is the highest temperature reached on the external surface, while 1140° C. are attained inside.

The flue gas top temperature has been 1350° C. The flue gas temperature, with the highest temperature on the anodes being 200° C., was about 680° C. with a 6.5% approximate oxygen content (as referred to "dry" gases). Also in this case, the gases issuing from the furnace showed no aromatic hydrocarbon contents.

Notwithstanding the very high temperature gradients, the calcined anodes showed no forms of cracking.

EXAMPLE 3

This example relates the results of a series of tests carried out to determine the lower limit of the conditions which characterize the method of this invention, that is to say, of the conditions where the organic matter released from the anodes is fully burned in situ, within the furnace itself.

In conducting these tests, the cool air injected into the zone 2 to supply the required oxygen to support combustion of the volatile organic substances has been related to the oxygen content of the fumes at the outlet from the zone 2, that is between the zone 2 and zone 1 shown in FIG. 1.

The fumes temperature, contrary to the two previous examples, has been controlled, rather than through excess cool air, by using an inert gas having an oxygen content below 0.1% at ambient temperatures.

Starting with the same conditions as specified in Example 2, the amount of cool air injected into the zone 2 has been gradually decreased until the oxygen concentration in the fumes from the zone 2 toward the zone 1 reached 2%. In such conditions, the temperature of the fumes reached 850° C.; in such conditions the fumes from the furnace still showed no traces of aromatic hydrocarbons.

A further decrease in the amount of cool air admitted, down to an oxygen concentration of 1.5%, resulted in an increase in the fumes temperature to about 870° C., but an analysis of the fumes revealed traces of aromatic hydrocarbons. This was evidence of the fact that notwithstanding the high temperature of the fumes, the released volatile substances cannot be completely burned where the concentration of oxygen in the fumes at the outlet from the zone 2 is lower than 2%.

In the course of a subsequent test, using the inert gas for cooling the fumes and proportionately regulating the amount of cool air, the fumes temperature has been lowered to 600° C., 550° C., and 500° C., respectively, while maintaining the oxygen concentration around 2%. The first traces of aromatic hydrocarbons have been recorded at 550° C., and at 500° C., 25 mg/N $m^3$ of such hydrocarbons have been measured in the fumes. As the fumes temperature is brought back to 550° C., there remain traces of the mentioned aromatic substances, even if the concentration of oxygen in the fumes is raised to about 4%.

These results are summarized in Table 1 herein below, and show that the temperature of 550° C. constitutes a limit value below which complete combustion of polynuclear aromatic hydrocarbons cannot be achieved.

TABLE 1

| Test No. | $O_2$ % (vol.) | Fumes temperature (°C.) | Concentration of organic matter in the fumes issuing from the furnace |
|---|---|---|---|
| 3,1 | 2 | 850 | non-detectable |
| 3,2 | 1.5 | 870 | traces only |
| 3,3 | 2 | 600 | non-detectable |
| 3,4 | 2 | 550 | traces only |
| 3,5 | 2 | 500 | 25 mg/N $m^3$ |
| 3,6 | 4 | 550 | traces only |

We claim:

1. A method of calcining carbonaceous bodies particularly useful in the manufacture of anodes for electrolytically reducing aluminium wherein said bodies coated with an antioxidizer protective powder are passed through a tunnel type furnace where they are calcined at a temperature up to about 1200° C. characterized in that an oxidizing atmosphere and thermal conditions are established within the furnace at least in the area surrounding and directly contacting at least part of the external surfaces of said coated bodies such that when said bodies achieve a temperature of 200°-600° C. where at said bodies release volatile organic substances, said oxidizing atmosphere has a temperature of at least 550° C. and an oxygen content of at least 2% by volume referred to the total volume of the dry gas present, whereby complete combustion of said volatile substances takes place within the furnace in at least said area which is directly contacting said coated bodies to yield gases free of said volatile organic substances.

2. A method according to claim 1, wherein the heat application rate for said carbonaceous bodies in said temperature range from 200° C. to 600° C. varies from about 10° C./hour to about 45° C./hour on the external surface thereof, and from about 10° C./hour to 40° C./hour on the inside thereof.

3. A method according to claim 2, wherein said carbonaceous bodies are transported through said tunnel type furnace in countercurrent to the gas flow through said furnace.

4. A method according to claim 2, wherein said carbonaceous bodies are caused to move through said furnace in equicurrent to the gas flow through said furnace up to the exit from said zone of combustion of said volatile organic substances and then in countercurrent to the gas flow up to the exit of said bodies from the furnace.

5. A method according to claim 1, wherein the temperature and the oxygen concentration of said oxidizing atmosphere are regulated by injecting cool air at ambient temperature into said zone of combustion of volatile organic substances.

6. A method according to claim 1, wherein the temperature and the oxygen concentration of said oxidizing atmosphere are regulated by injecting preheated air into said zone of combustion of volatile organic substances.

7. A method according to claim 6, wherein said preheated air is derived from said oxidizing atmosphere of the furnace at an area of said furnace where said atmosphere undergoes preheating by contacting said carbonaceous bodies.

8. A method according to claim 5, wherein the injection of air is effected in a perpendicular direction to the general gas flow direction through said furnace to thus induce turbulent flow conditions effective to rapidly make the temperature levels homogeneous across a transverse section through said zone of combustion of volatile organic substances.

9. A method according to claim 6, wherein the injection of air is effected in a perpendicular direction to the general gas flow direction through said furnace to thus induce turbulent flow conditions effective to rapidly make the temperature levels homogeneous across a transverse section through said zone of combustion of volatile organic substances.

10. A method according to claim 1, wherein said carbonaceous bodies, as coated with said protective powder, are accommodated in porous wall muffles open at the top allowing the outflowing of said volatile organic substances therethrough whereby the combustion of said volatile organic substances occurs at the open top of the coated carbonaceous bodies and externally to the muffle walls.

* * * * *